US012619235B2

(12) United States Patent
Subramanian et al.

(10) Patent No.: US 12,619,235 B2
(45) Date of Patent: May 5, 2026

(54) AGRICULTURAL MACHINE CONTROL BASED ON AGRONOMIC AND MACHINE PARAMETERS

(71) Applicant: Deere & Company, Moline, IL (US)

(72) Inventors: Shriraam Prabu Subramanian, Pune (IN); Tyler D. Schleicher, Ankeny, IA (US)

(73) Assignee: Deere & Company, Moline, IL (US)

( * ) Notice: Subject to any disclaimer, the term of this patent is extended or adjusted under 35 U.S.C. 154(b) by 247 days.

(21) Appl. No.: 17/959,653

(22) Filed: Oct. 4, 2022

(65) Prior Publication Data

US 2024/0111292 A1     Apr. 4, 2024

(51) Int. Cl.
*G05D 1/00* (2024.01)
*A01D 41/127* (2006.01)

(52) U.S. Cl.
CPC ....... *G05D 1/0214* (2013.01); *A01D 41/1278* (2013.01)

(58) Field of Classification Search
CPC .......................... G05D 1/0214; A01D 41/1278
See application file for complete search history.

(56) References Cited

U.S. PATENT DOCUMENTS

| | | | | |
|---|---|---|---|---|
| 6,484,078 | B1 * | 11/2002 | Kageyama | G08G 1/20 701/25 |
| 2005/0273253 | A1 * | 12/2005 | Diekhans | G01C 21/20 701/50 |

| | | | | |
|---|---|---|---|---|
| 2014/0278696 | A1 * | 9/2014 | Anderson | G06Q 10/047 705/7.23 |
| 2017/0166204 | A1 * | 6/2017 | Yoo | G08G 1/16 |
| 2018/0011495 | A1 * | 1/2018 | Sakaguchi | A01B 76/00 |
| 2018/0359905 | A1 * | 12/2018 | Foster | G05D 1/0219 |
| 2021/0084812 | A1 * | 3/2021 | Matus | A01D 34/008 |
| 2021/0195823 | A1 * | 7/2021 | Yuasa | G05D 1/0278 |
| 2021/0267115 | A1 * | 9/2021 | Fjelstad | G05D 1/0219 |
| 2021/0294337 | A1 * | 9/2021 | Van Mill | G05D 1/0246 |
| 2021/0339768 | A1 * | 11/2021 | Kakkar | G05D 1/6484 |
| 2023/0039092 | A1 * | 2/2023 | Anderson | A01M 7/0089 |
| 2023/0255138 | A1 * | 8/2023 | Sato | A01D 34/008 701/28 |
| 2024/0004390 | A1 * | 1/2024 | Iwase | B60W 60/0011 |

FOREIGN PATENT DOCUMENTS

CN          115014358 A  *  9/2022

* cited by examiner

*Primary Examiner* — Dale W Hilgendorf
*Assistant Examiner* — Hana Lee
(74) *Attorney, Agent, or Firm* — Christopher J. Volkmann; KELLY, HOLT & CHRISTENSON PLLC

(57)          ABSTRACT

A control system detects an agricultural machine position to determine when the agricultural machine is approaching a decision point. The decision point is a point at which the agricultural machine can move forward along one of two or more predefined possible paths. The control system detects agronomic factors and vehicle-related parameters to decide on the path to take at the decision point. The control system then generates control signals to pursue the path decided upon.

16 Claims, 7 Drawing Sheets

AGRICULTURAL MACHINE CONTROL BASED ON AGRONOMIC AND MACHINE PARAMETERS

The present description relates to agricultural machines. More specifically, the present description relates to controlling agricultural machines based on agronomic and machine parameters.

BACKGROUND

There are a wide variety of different types of agricultural machines. Some such machines include planters, harvesters, sprayers, tillage machines, and other machines. Such machines may be self-propelled machines, or they may be machines that have attached implements. Similarly, such machines may have towed implements. In addition, the form of the machines can take a wide variety of different forms. For instance, the machine forms can include combine harvesters, tractors, articulated tractors, machines that have wheels or tracks, machines that have controllable implements or attachments, among other forms.

Such agricultural machines can be controlled using different types of control systems. Some control systems are manually controlled, whereas others are semi-automated systems. For example, a semi-automated system may use automatic machine navigation to navigate the agricultural machine along a guidance line, but use manual inputs to perform other functions. Still other machines are fully autonomous machines. With fully autonomous machines, a farmer or other operator may move the machine to a given field and then initiate the autonomous operation of the machine. The machine may operate autonomously in a manned configuration in which an operator is present in the operating compartment of the machine, but the machine is still operating autonomously, or in an unmanned configuration in which no operator is present in the operating compartment of the machine.

The discussion above is merely provided for general background information and is not intended to be used as an aid in determining the scope of the claimed subject matter.

SUMMARY

A control system detects an agricultural machine position to determine when the agricultural machine is approaching a decision point. The decision point is a point at which the agricultural machine can follow one of two or more predefined possible paths. The control system detects agronomic factors and vehicle-related parameters to decide on the path to take at the decision point. The control system then generates control signals to pursue the path decided upon.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are a wide variety of different types of agricultural machines that are controlled using different types of control systems, such as manually actuated control systems, semi-autonomous systems, and fully autonomous systems. There are many points during the operation of an agricultural machine where a runtime decision, as to the route that the machine is to take, must be made. For instance, everywhere that there is a branch where the agricultural machine can take one of two or more predefined possible routes, or paths a decision must be made as to which particular path to follow. The predefined possible paths are predefined in that they may be defined, prior to the agricultural machine reaching the decision point, by any of a variety of different criteria. Such criteria can include a previous planting operation or other previous operation, the location of an obstacle that the agricultural machine must navigate around in one of two different directions, or other criteria that can be used to define possible paths at a decision point, prior to the agricultural machine reaching the decision point.

Figure 1:
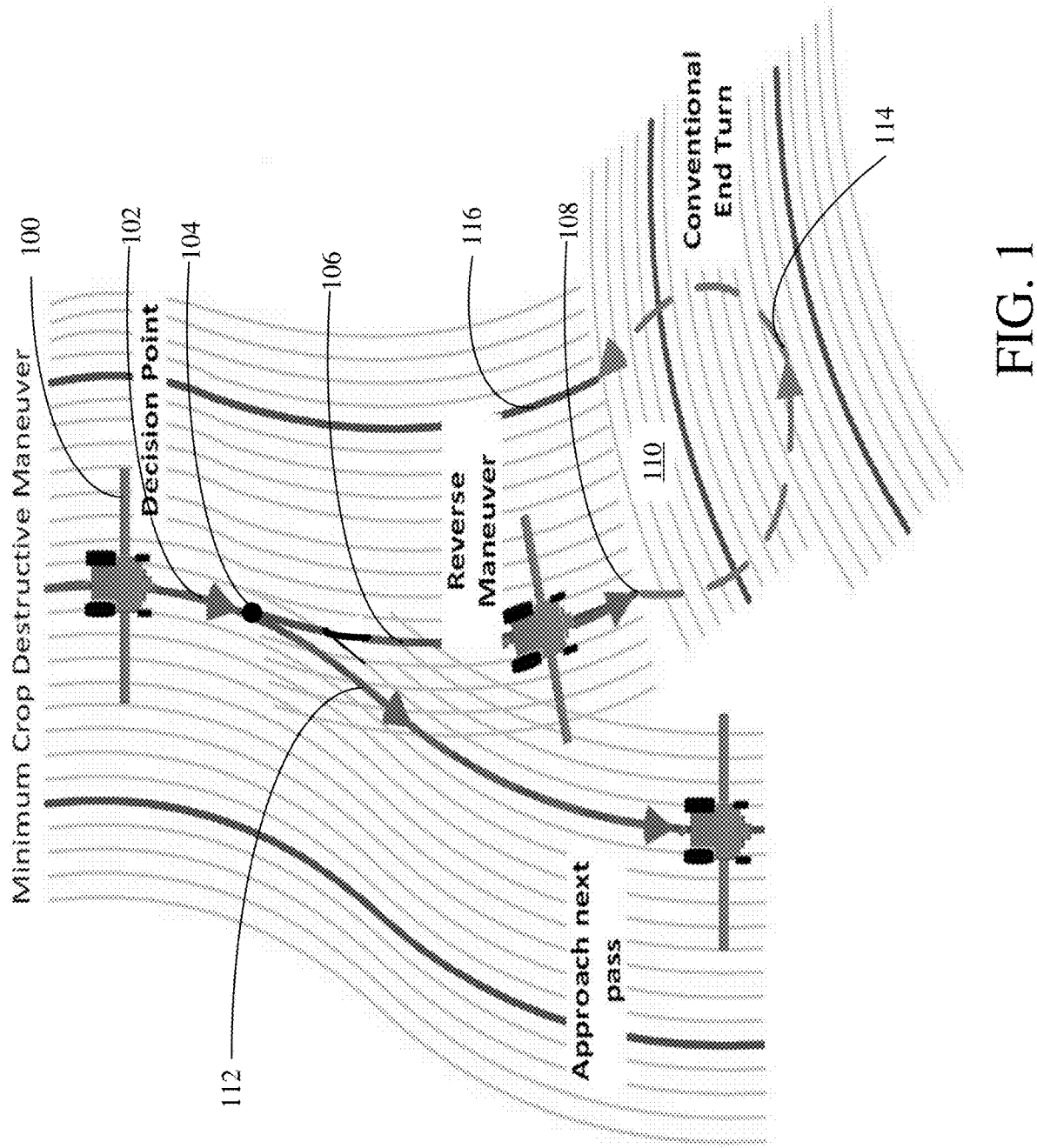
FIG. 1 is a pictorial illustration showing one example of an agricultural machine approaching a decision point.

By way of example, FIG. 1 is a pictorial illustration showing one example of such a decision point. In FIG. 1, an agricultural machine (e.g., a combine harvester) 100 is following a guidance line 102 which is provided by a navigation system. It can be seen that the planted rows overlap one another, and diverge into two different directions, beginning at decision point 104. Thus, two different predefined possible paths 106 and 112 are defined by the location of the crop rows planted during a prior planting operation. This means that, in one example, machine 100 may follow a first possible path 106 to harvest crop up to a point 108 where the machine 100 reaches end rows 110. In another example, machine 100 can follow a second possible path 112 to harvest crop in rows that extend beyond point 108 in the field so that the path 112 is longer than the path 106. Thus, at decision point 104, the control system (when machine 100 is being operated autonomously) must make a decision as to which path (106 or 112) to follow. A wide variety of different criteria can be used in order to make that decision.

For instance, in one example, the control system may make a decision to follow path 106 to the point 108 in the field, and then to perform a conventional end turn indicated by arrow 114 and continue along a next pass 116. However, the conventional turn 114 may damage crops if the end rows 110 have not been harvested yet. Therefore, in another example, machine 100 may continue along path 112. However, this would leave the crop along path 106 unharvested so that machine 100 may need to return, at some point, to harvest that portion of the crop. Following path 112 would thus reduce crop damage to the end rows 110, but may reduce the efficiency of the harvesting operation. In yet another example, machine 100 can follow path 106 to the point 108 where the machine 100 reaches the end rows 110, and then perform a reverse maneuver, reversing back to decision point 104, and continuing along pass 112.

The decision thus may consider a wide variety of criteria, such as the capabilities of machine 100 (e.g., whether it can reverse the entire length of path 106), agronomic parameters (such as the amount of crop damage that may be inflicted by machine 100 preforming turn 114 in unharvested end rows 110) and machine safety parameters (such as whether machine 100 can execute the turn 114 without colliding with an object or boundary obstacle or without crossing a field boundary, as well as other route information, agronomic factors, vehicle parameters, and machine safety parameters.

The present description thus describes a control system which detects the agricultural machine approaching a route decision point and performs processing to process route criteria, agronomic factors, vehicle parameters and/or machine safety parameters to make a decision as to which route or path to follow. The control system then generates control signals to implement any mission plan changes (e.g., to the route, machine speed, maneuvers, etc.) as well as to perform any machine function control (such as to raise or lower an implement, etc.) and to identify a next pass to follow. The control signals can be applied to controllable systems to control the agricultural machine accordingly. In one example, the machine is automatically controlled to follow an identified path. By automatically, it is meant in one example, that the function or operation is performed without further human involvement except, perhaps, to initiate or authorize the function or operation.

Figure 2A:
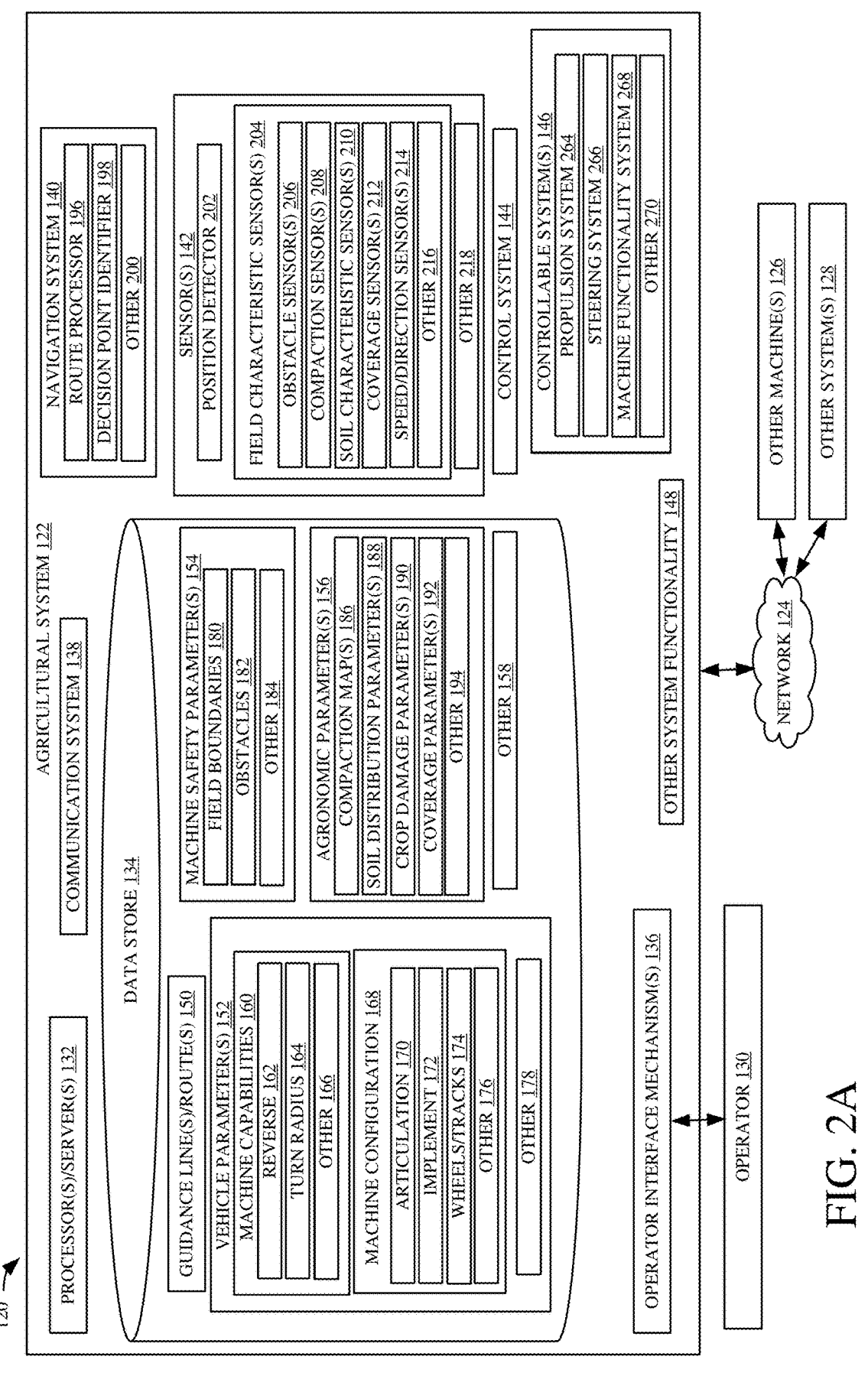
FIGS. 2A and 2B show a block diagram of one example of an agricultural system architecture.
Figure 2B:
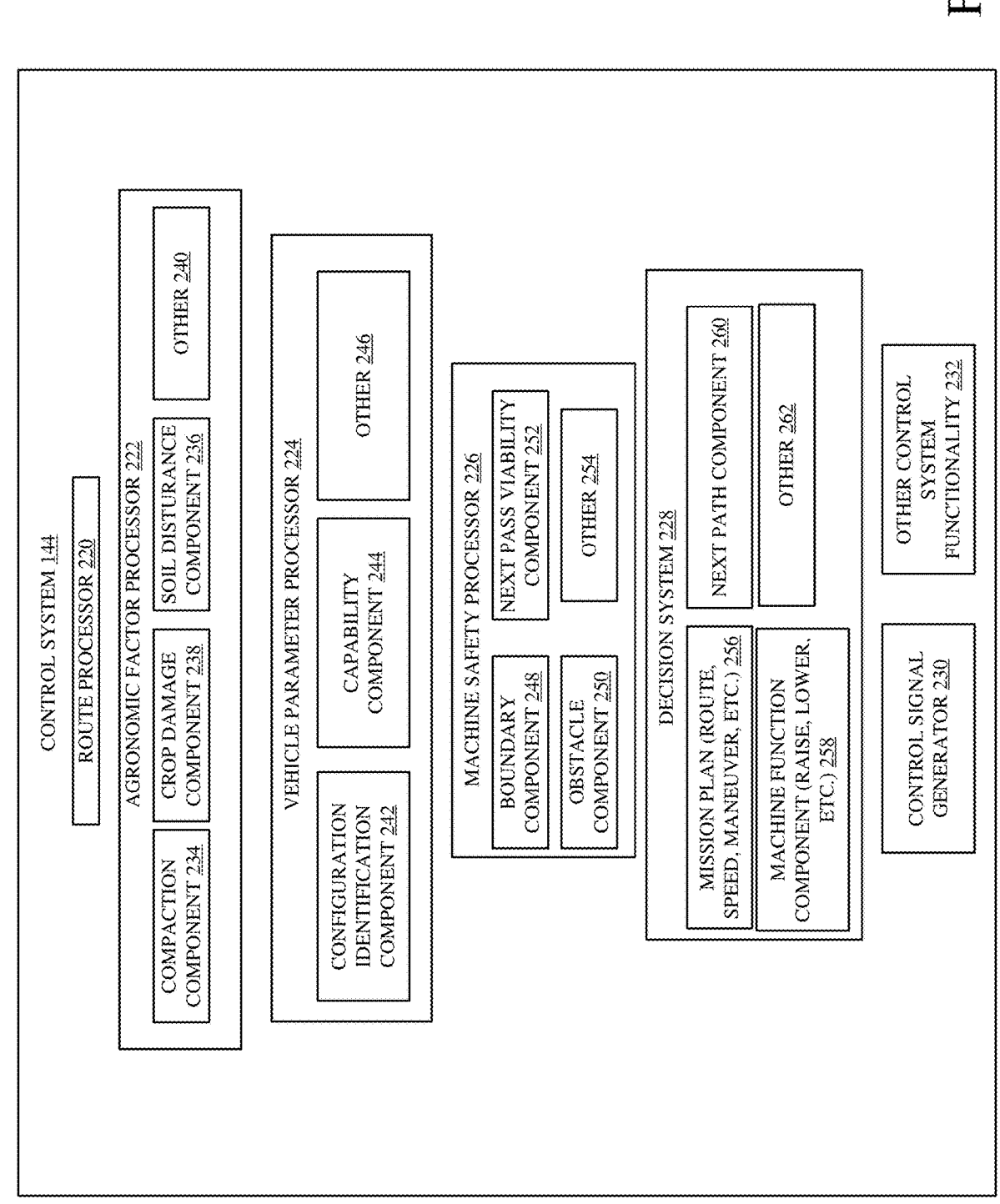

FIG. 2A is a block diagram of one example of an agricultural system architecture 120 which includes an agricultural system 122, which may be implemented on a machine 100 or elsewhere, and which may communicate over network 124 with other machine(s) 126, or other system(s) 128. FIG. 2A also shows that agricultural system 122 may communicate with an operator 130. FIG. 2B shows an example of a control system 144 in more detail. FIGS. 2A and 2B will be described with respect to an example in which agricultural system 122 is deployed on agricultural machine 100. However, it will be noted that some portions of agricultural system 122 may be located on machine 100 while other portions may be located on other machines 126 or other systems 128. The other machines 126 may be other machines operating in the same field as machine 100 or elsewhere. Other systems 128 may be vendor systems, farm manager systems, remote server systems (such as cloud-based systems), or other systems. Also, FIGS. 2A and 2B are described with respect to operator 130 being local to agricultural machine 100. However, agricultural machine 100 may be a fully autonomous system in which no operator 130 is located locally on the machine 100. Therefore, FIGS. 2A and 2B show only one example of architecture 120 and other architecture configurations can be used as well.

Before describing the overall operation of architecture 120 in more detail, a description of some of the items in agricultural system 122, and their operation, will first be provided. FIGS. 2A and 2B will be described in conjunction with one another. Agricultural system 122 includes one or more processors or servers 132, data store 134, operator interface mechanisms 136, communication system 138, navigation system 140, sensors 142, control system 144, controllable systems 146, and other system functionality 148. Data store 134 can include a set of guidance lines or routes 150 which may indicate a path or route that machine 100 can take through a field, vehicle parameters 152, machine safety parameters 154, agronomic parameters 156, and other items 158. The vehicle parameters may include machine capabilities 160, such as the reverse capability of the machine 162 (whether the machine can reverse and perhaps a distance over which the machine can safely and accurately follow a guidance line in reverse), the turning radius 164 of the machine, and other machine capabilities 166. The vehicle parameters 152 can also include the machine configuration parameter 168, which identifies machine configuration such as whether the machine is articulated 170, has a towed implement 172, has wheels or tracks 174, and other machine configuration information 176. The vehicle parameters 152 can include other parameters 178 as well. The machine safety parameters 154 can identify the field boundaries 180 in the field where machine 100 is located, the location of any obstacles 182 in the field, or other information 184 (such as the geometric configuration of field corners) or other locations in the field where machine 100 may become stuck (such as unable to turn out of a corner without hitting a boundary, etc.). Agronomic parameters 156 may include maps, such as a compaction map 186 that maps the levels of compaction or estimated compaction to different locations in the field. The agronomic parameters 156 can include soil disturbance parameters 188, which may be parameters that indicate the likelihood that undesirable soil disturbance may occur if machine 100 travels over that location of the field. Such soil disturbance parameters may be based on soil moisture, soil type, the grade at the location, among other things. The agronomic parameters 156 can include crop damage parameters 190 which identify the likely or estimated crop damage that will occur if machine 100 travels over a given location of the field. For instance, referring again to FIG. 1, if the machine 100 makes the turn 114 over end rows 110 that have not yet been harvested, then the crop damage parameter 190 for that location of the field may be relatively high. This is just one example of how crop damage parameters may be determined. Agronomic parameters 156 may also include coverage parameters 192 which indicate whether a portion of the field has been covered by machine 100 or a different machine (such as whether it has had chemicals applied where machine 100 is a sprayer, been tilled where machine 100 is a tillage machine, or harvested where machine 100 is a harvester, etc.). Agronomic parameters 156 can include other agronomic parameters 194 as well.

Navigation system 140 illustratively includes route processor 196, decision point identifier 198, and other items 200. Sensors 142 can include a position detector 202, field characteristic sensors 204 which, themselves, can include obstacle sensors 206, compaction sensors 208, soil characteristic sensors 210, coverage sensors 212, speed/direction sensors 214, and other field characteristic sensors 216. Sensors 142 can include a wide variety of other sensors 218 as well.

Control system 144 illustratively includes route processor 220, agronomic factor processor 222, vehicle parameter processor 224, machine safety processor 226, decision system 228, control signal generator 230, and other control system functionality 232. Agronomic factor processor 222 can include compaction component 234, soil disturbance component 236, crop damage component 238, and other items 240. Vehicle parameter processor 224 can include configuration identification component 242, capability component 244, and other items 246. Machine safety processor 226 can include boundary component 248, obstacle component 250, next pass viability component 252, and other items 254. Decision system 228 can include mission plan component 256, machine function component 258, next path component 260, and other items 262. Controllable systems 146 can include propulsion system 264, steering system 266, machine functionality system 268, and other items 270.

Guidance lines/route 150 may be generated by an automated navigation system or another mapping system and may indicate the route or guidance lines that are to be followed by machine 100. Navigation system 140 may automatically control the propulsion system 264 and steering system 266 to follow the guidance lines/route 150 or the guidance lines/route 150 may be displayed for operator navigation as well. In the example discussed herein, it assumed that navigation system 140 automatically navigates machine 100 along the guidance lines/route 150.

The vehicle parameters 152 are parameters corresponding to the particular vehicle 100 that is being controlled. The vehicle parameters 152 may include vehicle capabilities 160. The capabilities 160 may define the particular capabilities that the machine 100 has. For instance, reverse indicator 162 identifies whether the machine 100 can operate in reverse. The turn radius indicator 164 identifies the turning radius of the machine 100 in its current configuration (e.g., with an implement attached or being towed, etc.). Other machine capabilities 166 can include machine dynamics, other machine dimensions, machine power capabilities, etc.

Machine configuration parameters 168 define the configuration of a machine 100. Articulation parameter 170 identifies whether the machine is an articulated machine, such as an articulated tractor. Implement parameter 172 identifies whether the machine has an implement and, if so, the type of implement. For instance, implement parameter 172 may indicate that the machine 100 has an implement attached, a towed implement, or a different type of implement. Wheels/track parameter 174 defines the type of ground engaging elements (e.g., wheels, tracks, etc.) that the machine 100 is currently configured with. The types of ground engaging elements may affect the crop damage inflicted by machine 100, the soil disturbance by machine 100 as it travels over the soil, the compaction that machine 100 will inflict on the soil, etc.

Machine safety parameters 154 identify a variety of different parameters that may be used to determine whether machine 100 is safe in following a specific path through the field. For instance, field boundaries 180 identify the location of the boundaries of the field, where a fence, trees or other obstacles may exist. The machine dimensions identified in machine configuration parameters 168 may be used to determine whether the machine is able to safely navigate a particular path given the location of that path and the location of the boundaries. Field boundaries may also identify tight corners where machine 100 may get stuck or be unable to safely navigate through without crossing a boundary. Obstacle parameters 182 identify the location of obstacles within a field and may also be used to determine whether machine 100 can navigate a particular path safely (e.g., without colliding with an obstacle, etc.). There may be a wide variety other machine safety parameters 184, such as machine stability parameters that indicate the stability of the machine (e.g., a machine may be less stable when tanks are full and when traveling on a side slope, etc.), or other parameters.

Agronomic parameters 156 can be used to identify whether a particular path will result in greater or lesser damage to a field agronomically than another path. For instance, compaction maps 186 may identify the level of compaction along a route. This can be used along with the soil type and soil moisture, as well as with the wheel/tracks indicator 174 and other machine information to determine the extent of additional compaction that machine 100 may inflict on the soil if machine 100 travels along a particular path. Soil disturbance parameters 188 may also be used with other parameters to determine the level of soil disturbance that machine 100 will cause when machine 100 travels along a particular path. Crop damage parameters 190 may include such things as whether the crop has emerged, how long ago it was planted, and other parameters, that may be used along with other parameters to determine how much crop damage machine 100 will inflict on the crop if machine 100 takes a particular path.

Coverage parameters 192 indicate which areas of the field have already been covered by machine 100. For instance, and referring again to FIG. 1, coverage parameters 192 may indicate which areas of the field have not yet been harvested. For example, coverage parameters 192 may identify that the end rows 110 are not yet harvested. Therefore, the coverage parameters 192 may be used in conjunction with crop damage parameters 190 to determine the amount of crop damage that machine 100 will inflict if machine 100 takes the conventional end turn 114 through end rows 110. These are just examples of agronomic parameters 156, and a wide variety of other agronomic parameters 194 can be used as well.

Operator interface mechanisms 136 can include buttons, a steering wheel, levers, linkages, joysticks, knobs, peddles, and other mechanisms. Operator interface mechanisms 136 can also include display screens that display information and that display operator input mechanisms, such as links, icons, buttons, or other items that may be actuated using a touch gesture, a point and click device, voice commands, etc. The operator interface mechanisms 136 may also include a microphone and speakers (such as where speech recognition and/or speech synthesis are provided), haptic mechanisms, or other items that may provide and receive audio, visual, and haptic information.

Communication system 138 includes a system that facilitates the communication of items in agricultural system 122 among themselves, and that also facilitates communication over network 124. Therefore, communication system 138 may be a controller area network (CAN) bus and bus controller or other communication system. Network 124 may be a local area network, a wide area network, a near field communication network, a Wi-Fi network, a Bluetooth® network, a cellular communication network, or any of a wide variety of other networks or combinations of networks. Communication system 138 may thus vary depending on the type of network 124 that it communicates over.

Sensors 142 may sense a wide variety of different types of variables that can be used by agricultural system 122. Position detector 202 may be a global navigation satellite system (GNSS) receiver or, a dead reckoning detector, cellular triangulation detector, or another type of position detector that can detect the position of machine 100 in a global or local coordinate system. Field characteristic sensors 204 can sense a wide variety of different types of characteristics of the field in which machine 100 is traveling such as grade or slope, shape, or other characteristics. Obstacle sensors 206 can include RADAR or LIDAR sensors, infrared sensors, mechanical sensors, or other sensors that sense obstacles in a field. Compaction sensors 208 may include mechanical or other sensors that sense the level of compaction of soil in the field. Soil characteristic sensors 210 can sense soil characteristics, such as soil type, soil moisture, soil color, etc. Coverage sensors 212 can sense where vehicle 100 has already covered the field (e.g., sprayed the field, harvested the field, planted the field, etc.). Coverage sensors 212 can include optical sensors or processors that sense where machine 100 has performed operations in the field (e.g., the sense standing crop or harvested crop, or other sensors), infrared sensors that sense where the crop has been sprayed, sensors that sense where the crop has been tilled, etc. Speed/direction sensors 214 sense the speed and direction of machine 100. Speed/direction sensors 214 can thus include accelerometers, inertial measurement units, speedometers, etc. Sensors 214 can also use the output of other sensors to derive the speed and direction of machine 100. For instance, sensors 214 may obtain multiple outputs from position detector 202 to determine the direction of travel, and the speed of travel, of machine 100, based upon the two different position outputs from position detector 202. Field characteristic sensors 204 can include a wide variety of other sensors 216 that sense other field characteristics as well. Also, other sensors 218 can sense such things as fuel consumption, the fill level of various tanks on machine 100, and other sensors.

Navigation system 140 can be used to navigate machine 100 along a route or guidance line 150 automatically or semi-automatically. Similarly, navigation system 140 can be used to identify a set of possible next passes that machine 100 can take after it performs a turn at the end of a current pass.

Route processor 196 can access the guidelines/routes 150 in order to generate control signals to navigate machine 100 along the desired route or guidance line. Route processor 196 can also identify next passes or possible next passes through the field. Decision point identifier 198 analyzes the route that machine 100 is currently taking and identifies the decision points as points where there are a plurality of predefined possible paths that machine 100 could follow. The criteria for identifying where there are multiple predefined possible paths may be based on a prior operation, the location of objects, etc.

Control system 144 can process the route information indicative of the route and possible paths that machine 100 can take, the agronomic factors, vehicle parameters, and machine safety parameters to generate outputs indicative of the agronomic effect that machine 100 will have on a particular path, the ability of the machine 100 to follow a path, and whether machine 100 can follow a path safely. These outputs are provided to decision system 228 which generates an output indicative of a decision that will be made at the upcoming decision point identified by decision point identifier 198. Once the decision is made, control signal generator 230 generates control signals to control controllable subsystems 146 and other parts of machine 100 to implement the decision. For instance, referring again to FIG. 1, if decision system 228 generates an output indicating that machine 100 should follow path 106 at the decision point 104 to the end rows 108 and then reverse back to decision point 104 and subsequently follow path 112, then control signal generator 230 generates control signals and outputs the control signals to navigation system 140 and controllable systems 146 to execute those maneuvers based upon the decision output by decision system 228.

More specifically, route processor 220 can identify the different possible paths that machine 100 can take at the decision point, based upon an output from navigation system 140, based upon the guidance lines/route 150, or based upon other items. Agronomic factor processor 222 can process the agronomic factors identified by agronomic parameters 156 and sensors 142 to determine the agronomic affect machine

100 will have if it follows the different predefined possible paths. Compaction component 234 processes any compaction information that is available to control system 144 to determine what effect machine 100 will have on the compaction as it follows the different predefined possible paths that may be followed at decision point 104. Soil disturbance component 236 processes any soil disturbance parameters that are available to determine the soil disturbance that machine 100 will inflict on soil, as it follows the different predefined possible paths that may be followed at decision point 104. Crop damage component 238 processes the various crop damage parameters that may indicate the amount of crop damage that machine 100 will inflict if it follows the different predefined possible paths beginning at decision point 104. Agronomic factor processor 222 may aggregate the outputs from its different components to output an aggregate agronomic factor output to decision system 228 indicating the effect, on the agronomics, that machine 100 will have if it follows the different predefined possible paths. In another example, the different components in agronomic factor processor 222 can each provide an output to decision system 228 indicating the effect that machine 100 will have on the different individual agronomic factors.

Vehicle parameter processor 224 processes the various vehicle parameters and vehicle information to generate an output indicative of which path is best given the vehicle parameters. Configuration identification component 242 identifies the configuration of machine 100 and generates an output indicative of which path the machine 100 can more easily follow given its configuration. Capability component 244 processes the machine capabilities 160 to determine which types of maneuvers the machine 100 can take as it proceeds past decision point 104 (such as whether it can reverse back to decision point 104 after it has passed that decision point, whether it has the turning radius to navigate a turn 114, etc.). Configuration identification component 242 identifies the configuration of the machine 100 (such as whether it is articulated, whether it has an attachment or is towing an implement, etc.). Components 242 and 244 generate outputs indicative of how the machine configuration and its capabilities bear on the different paths that machine 100 can take at decision point 104. Vehicle parameter processor 224 can generate an aggregated output or individual outputs indicative of how the machine configuration, the machine capabilities, and other machine parameters affect the ability of the machine 100 to follow the different paths.

Machine safety processor 226 processes various safety parameters to determine whether machine 100 can safely follow the different paths at decision point 104. Boundary component 248 analyzes the boundaries of the field, along with the different routes that machine 100 can follow at decision point 104, as well as the machine dimensions, turning radius, of vehicle 100, etc., to determine whether any portion of vehicle 100 will cross a field boundary if machine 100 follows any of the different paths at decision point 104. Obstacle component 250 analyzes the location of different obstacles in the field, along with the size of the machine to determine whether the machine can safely travel along one of the paths without danger of colliding with an obstacle. Next paths viability component 252 analyzes the various vehicle parameters and machine safety parameters to determine whether machine 100 can even successfully navigate through the different paths. For instance, if taking path 106 (in FIG. 1) would lead machine 100 into a corner that is so tight that machine 100 could not execute a turn, and machine 100 has no reverse capabilities, then next path viability component 252 would generate an output indicating that path 106 is not viable for machine 100. This is just one example and other viability criteria will be processed as well. Machine safety processor 226 can generate an aggregate output indicative of the safety and viability with which machine 100 can navigate along the different predefined possible paths. In another example, machine safety processor 226 can generate a plurality of different outputs generated from the different components in processor 226.

The outputs from route processor 220, agronomic factor processor 222, vehicle parameter processor 224, and machine safety processor 226 are provided to decision system 228 in time for decision system 228 to decide which route (route 106 or 112 in the example shown in FIG. 1) that machine 100 should follow when it reaches decision point 104. In one example, decision system 228 is an artificial neural network, a deep learning system, or another type of classifier that receives inputs and generates an output indicative of the path that should be followed (and perhaps other information such as modifications to the mission plan of machine 100, machine function controls that should be performed, the next path that should be chosen, etc.). Decision system 228 can also be a machine learned system, a rules-based system, a model, or other decision logic that receives inputs and provides an output indicative of a chosen path and perhaps other information.

Mission plan component 256 can generate an output indicative of changes that should be made to the mission plan of machine 100 based upon the decision. Those changes may identify the particular route that machine 100 is to follow at decision point 104, the speed of machine 100, any of a wide variety of various maneuvers that the machine 100 is to perform (such as a turn, reverse, etc.). Machine function component 258 generates an output indicative of different machine functions that should be performed. For instance, machine function component 258 may provide an output indicating that, as soon as machine 100 reaches the end rows 110 at point 108 on path 106 and begins to reverse, then machine 100 should be controlled to raise the header on the machine during the reverse maneuver. This is just one example. In another example, where machine 100 is pulling a planter, machine function component 258 may generate an output indicating that machine 100 should raise the planter when it is executing the reverse maneuver. These are all examples and a wide variety of other machine functions can be controlled, based upon the decision made by decision system 228. Next path component 260 generates an output identifying the next pass that machine 100 will take, given the decision made at decision point 104, and based upon the inputs received from the other processors 220, 222, 224, and 226.

Control signal generator 230 may be a processor or other component that receives the outputs from decision system 228 (and perhaps other items) and generates control signals to control controllable subsystems 146 and possibly other items, to carry out the decision indicated by the outputs from decision system 228. Control signal generator 230, for example, can control propulsion system 264 to move machine 100 forward or in reverse at a desired speed. Control signal generator 230 controls steering system 266 based on outputs from navigation system 140 and decision system 228 to steer machine 100 along a route or guidance line based on the decision output from decision system 228. Control signal generator 230 can also generate output signals to control machine functionality system 268 based on the various machine functions that are to be controlled given the decision output by decision system 228. Control signal generator 230 can also generate control signals to control operator interface mechanisms 136 to generate outputs for operator 130 or other operators. Control signal generator 230 can also generate control signals to control communication system 138 to communicate the decision and other information to other machines 126 that may be operating in the field, and/or to other systems 128 for storage, for future control during subsequent operations, and for other reasons.

Figure 3:
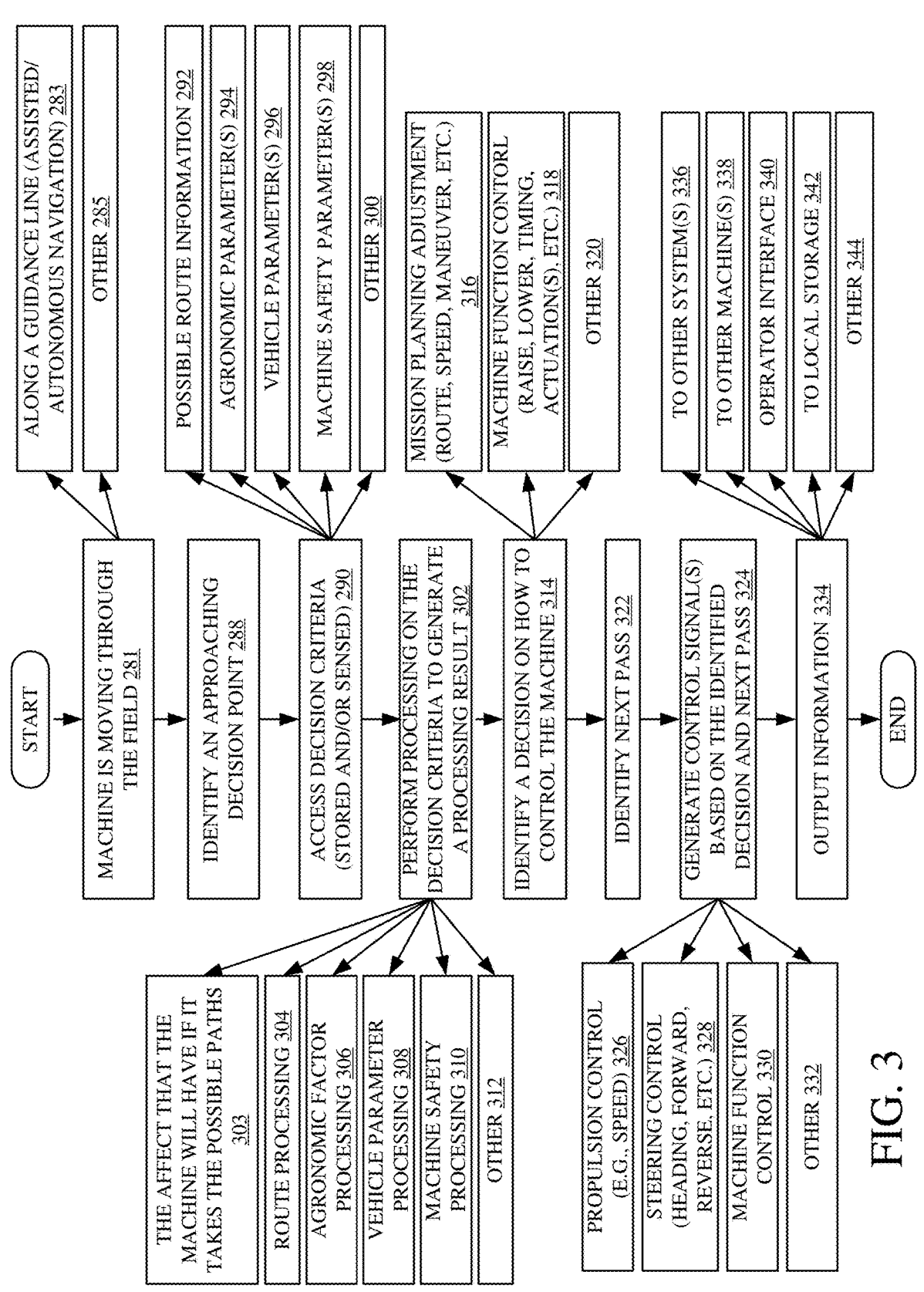
FIG. 3 is a flow diagram illustrating one example of the operation of an agricultural system.

FIG. 3 is a flow diagram showing one example of the operation of architecture 120. It is first assumed that machine 100 is moving through the field, as indicated by block 281 in the flow diagram of FIG. 3. In one example, machine 100 is moving through the field along a guidance line or route 150 under the assistance of navigation system 140, or in a fully autonomous mode under the direction of navigation system 140. Moving along the guidance line or route is indicated by block 283 in the flow diagram of FIG. 3. The machine 100 can be moving through the field in other ways as well, as indicated by block 285.

Decision point identifier 198 then identifies that a decision point (such as decision point 104 in FIG. 1) is approaching. Identifying the approaching decision point is indicated by block 288 in the flow diagram of FIG. 3.

Control system 144 accesses the decision criteria (which may be stored in data store 134 or sensed by sensors 142 or otherwise obtained). Accessing the decision criteria is indicated by block 290 in the flow diagram of FIG. 3. The decision criteria may include the route information that identifies the possible paths that machine 100 can take at the decision point 104, as indicated by block 292. Control system 144 can access the agronomic parameters that may be sensed or stored, as indicated by block 294. Control system 144 can access vehicle parameters which also may be sensed or stored, as indicated by block 296 and machine safety parameters which also may be sensed or stored, as indicated by block 298. The decision criteria can be accessed in other ways and include other criteria as well, as indicated by block 300.

Control system 144 then uses the various processors therein to perform processing on the decision criteria, as indicated by block 302. Route processor 220 can perform route processing 304. Agronomic factor processor 222 performs processing on the agronomic factors, as indicated by block 306. Vehicle parameter processor 224 performs processing on the vehicle parameters, as indicated by block 308, and machine safety processor 226 performs processing on machine safety parameters, as indicated by block 310. Control system 144 can perform a wide variety of other processing using other parameters as well, as indicated by block 312.

The results of processing the information is then provided to decision system 228 which identifies a decision on how to control the machine, such as which path to follow at the decision point, how to control the machine during travel along that path, etc. Identifying a decision as to how to control the machine is indicated by block 314 in the flow diagram of FIG. 3. For example, mission planning component 256 can generate an output indicative of adjustments to the mission plan (e.g., route, speed, maneuver, etc.) of machine 100. The mission plan adjustment may indicate the particular path that machine 100 is to follow at decision point 104. Making mission plan adjustments is indicated by block 316 in the flow diagram of FIG. 3. Machine function component 258 can generate an output, based upon the decision, indicating how to control various machine functions, as indicated by block 318. Such functions can include raising and lowering implements or attachments, the timing of the control operations, actuation of different mechanisms, etc. Decision system 228 can identify a decision on how to control machine 100 in other ways as well, as indicated by block 320.

Next path component 260 also identifies a next pass for machine 100, given the decision, as indicated by block 322. For instance, if the decision is to have machine 100 follow path 106 to end rows 108 and then reverse back to decision point 104, next path component 260 may identify the next pass as continuing along path 112 after machine 100 reverses to decision point 104. If the decision is to have machine 100 continue along path 106 and then make an end row turn 114, then next path component 260 may identify the next path as path 116. These are just examples of how the next pass may be identified.

The information from decision system 228 is output to control signal generator 230. Control signal generator 230 then generates control signals based upon the identified decision and the identified next pass, as indicated by block 324. The control signals can be propulsion control signals that control propulsion (e.g., speed) of machine 100, as indicated by block 326. The control signals can be steering control signals which control the heading and the forward/reverse direction of machine 100, as indicated by block 328. The control signals can be machine function control signals, as discussed above, as indicated by block 330, or any of a wide variety of other control signals 332.

Control signal generator 230 can also control communication system 138 to output information, as indicated by block 334. The communication system 138 can output the information to other systems 128, as indicated by block 336, to other machines 126, as indicated by block 338, to operator interface mechanisms 136, as indicated by block 340, to local storage 134, as indicated by block 342, or in other ways, as indicated by block 344.

Figure 4:
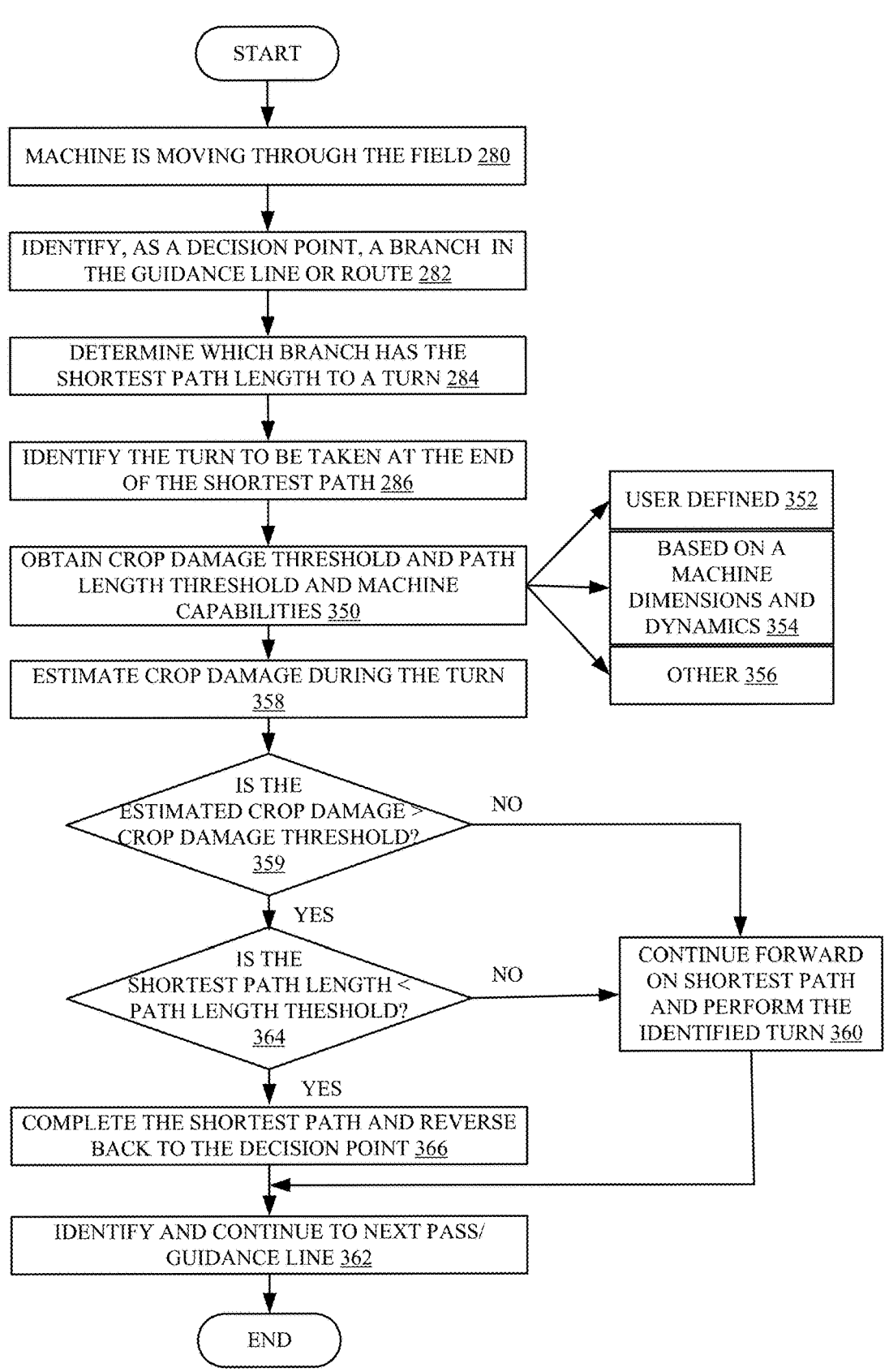
FIG. 4 is a flow diagram showing another, more detailed, example of the operation of an agricultural system.

FIG. 4 is a flow diagram illustrating one more detailed example of the operation of agricultural system 122. It is first assumed that machine 100 is moving through the field along a route or guidance line, as indicated by block 280 in the flow diagram of FIG. 4. Route processor 196 in navigation system 140 processes the route and controls the machine 100 to follow the route or guidance line. Decision point identifier 198 identifies, as a decision point, a branch in the guidance line or route (such as point 104 in FIG. 1). Identifying the decision point as a branch in the guidance line or route is indicated by block 282 in the flow diagram of FIG. 4. Route processor 220 in control system 144 then analyzes both of the paths at the decision point 104 (e.g., paths 106 and 112) to determine which path has the shortest path length to a turn. Determining the shortest path length, of the available paths at the decision point, is indicated by block 284 in the flow diagram of FIG. 4. In the example shown in FIG. 1, route processor 220 identifies the path 106 as having the shortest path length to the turn. Route processor 220 then identifies the turn that will be taken at the end of the shortest path 106. Referring to the example shown in FIG. 1, the turn is identified by arrow 114. Identifying the turn to be taken at the end of the shortest path is indicated by block 286 in the flow diagram of FIG. 4.

In the example shown in FIG. 4, the agronomic factors that are considered by agronomic factor processor 222 include crop damage and the machine capabilities considered by vehicle parameter processor 224 include the ability of the machine to operate in reverse, and the distance which machine 100 can operate in reverse, safely. For instance, if machine 100 is an articulated tractor and it is towing an implement, such as a planter, backing up long distance can be much more difficult than backing up short distances. Therefore, these types of capabilities are considered by vehicle parameter processor 224 in the example shown in FIG. 4.

Agronomic factor processor 222 then obtains a crop damage threshold value, and vehicle parameter processor 224 obtains a path length threshold as well as the machine capabilities 160. Obtaining the crop damage threshold, the path length threshold, and the machine capabilities is indicated by block 350 in the flow diagram of FIG. 4. The threshold values can be user-defined threshold values, as indicated by block 352 or the threshold values can be dynamically determined based upon the machine dimensions and machine configuration as well as the machine dynamics, as indicated by block 354. The threshold values can be obtained in other ways as well, as indicated by block 356. Crop damage component 238 then generates an estimate of the crop damage during the identified turn that is taken at the end of the shortest path identified in blocks 282-286 discussed above. Estimating the crop damage during the turn is indicated by block 358 in the flow diagram of FIG. 4.

Agronomic factor processor 222 then uses crop damage component 238 to determine whether the estimated crop damage meets as indicated by block 359 in the flow diagram of FIG. 4. If the estimated crop damage does not meet the crop damage threshold, the crop damage threshold, then this is output to decision system 228 which generates an output indicating that machine 100 should continue forward on the shortest path (path 106 in FIG. 1) and perform the identified turn at the end of that path (turn 114 in FIG. 1). Outputting a decision to continue on the shortest path and perform the identified turn is indicated by block 360 in the flow diagram of FIG. 4. Next path component 260 then identifies the next path (path 116 in FIG. 1) that machine 100 is to take and an indication of that path is output to navigation system 140 as a guidance line or route indicator. Identifying and continuing to the next pass is indicated by block 362 in the flow diagram of FIG. 4.

If, at block 358, it is determined that the estimated crop damage on turn 114 meets the crop damage threshold, then route processor 220 determines whether the shortest path length is less than the path length threshold, as indicated by block 364. The path length threshold may be set, for example, based upon how easily machine 100 can perform a maneuver at the end of the shortest path. For instance, one possible path may be that machine 100 will follow path 106 to the end rows 110 and then reverse course, back to decision point 104 and then continue along path 112. In evaluating that possible path, the path length threshold may be set to a distance that machine 100 can successfully reverse. For instance, if machine 100 is an articulated tractor pulling an attachment, then it may be relatively easy and straightforward to accurately reverse that machine for 30 feet, but it might be very difficult to accurately reverse that machine for 300 feet. Therefore, the path length threshold may be set to 30 feet. If, at block 364, the path length exceeds the path length threshold, this means that it is likely that machine 100 will not be able to successfully or accurately reverse through the entire path length of path 106 back to decision point 104. Thus, if the shortest path length is not less than the path length threshold, as determined at block 364, then again decision system 228 generates an output indicating that machine 100 should continue along the shortest path 106 and perform the identified turn 114 at the end of that path, even though the crop damage that will be inflicted on the crop exceeds the crop damage threshold.

If, at block 364, it is determined that the shortest path length does not meet the path length threshold, then this means that machine 100 will likely be able to successfully reverse through the entire shortest path length of path 106, back to decision point 104. If that is the case, then decision system 228 generates an output indicating that machine 100 should complete the shortest path 106 and then reverse back to the decision point 104 and continue on the next path 112. Generating an output indicating that machine 100 should complete the shortest path and reverse back to the decision point 104 is indicated by block 366 in the flow diagram of FIG. 4. Again, at that point, next path component 260 identifies the next path as being path 112 so machine 100 is controlled to follow path 112 forward from the decision point 104.

It can thus be seen that the present description describes a system for controlling an agricultural machine in which agronomic factors, vehicle parameters, and machine safety parameters are considered along with route information to make a decision as to how to control the machine at a decision point, which is represented by a branch in the path that the machine can take. The factors that may be considered include the machine capabilities, crop damage, soil disturbance, compaction, next pass viability, obstacle and boundary locations, machine configuration information, and a wide variety of other information. This enables the machine to be more accurately controlled by an autonomous or semi-autonomous control system.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of, the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components generators, processors, identifiers, functionality, and/or logic. It will be appreciated that such systems, components generators, processors, identifiers, functionality, and/or logic can be comprised of hardware items (such as processors and associated memory, or other processing components, some of which are described below) that perform the functions associated with those systems, components generators, processors, identifiers, functionality, and/or logic. In addition, the systems, components generators, processors, identifiers, functionality, and/or logic can be comprised of software that is loaded into a memory and is subsequently executed by a processor or server, or other computing component, as described below. The systems, components generators, processors, identifiers, functionality, and/or logic can also be comprised of different combinations of hardware, software, firmware, etc., some examples of which are described below. These are only some examples of different structures that can be used to form the systems, components generators, processors, identifiers, functionality, and/or logic described above. Other structures can be used as well.

Figure 5:
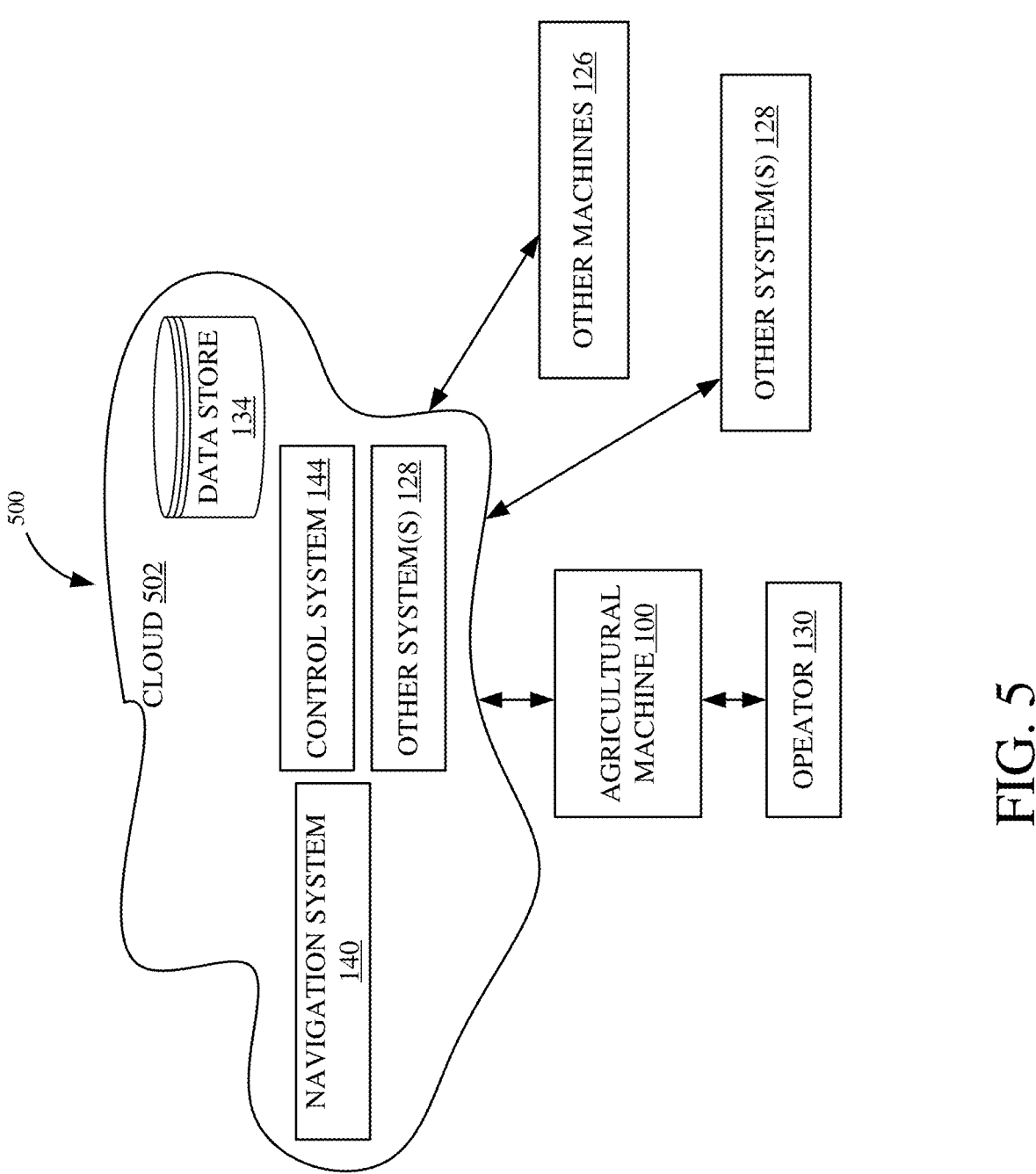
FIG. 5 is a block diagram showing one example of the agricultural system architecture shown in FIG. 2, deployed in a remote server environment.

FIG. 5 is a block diagram of machine 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions and the like described herein can be provided from a remote server at a remote location using a remote server architecture. Alternatively, the generators, processors, identifiers, functionality and the like can be provided from a conventional server, or they can be installed on client devices directly, or in other ways.

In the example shown in FIG. 5, some items are similar to those shown in previous FIGS. and they are similarly numbered. FIG. 5 specifically shows that control system 120, navigation system 140, other systems 128, and data store 134 can be located at a remote server location 502. Therefore, machine 100 accesses those systems through remote server location 502.

FIG. 5 also depicts another example of a remote server architecture. FIG. 5 shows that it is also contemplated that some elements of previous FIGS are disposed at remote server location 502 while others are not. By way of example, data store 134 or other systems 128 can be disposed at a location separate from location 502, and accessed through the remote server at location 502. Regardless of where the items are located, the items can be accessed directly by harvester 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 100 comes close to the fuel truck for fueling, the system automatically collects the information from the machine 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 100 until the machine 100 enters a covered location. The machine 100, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
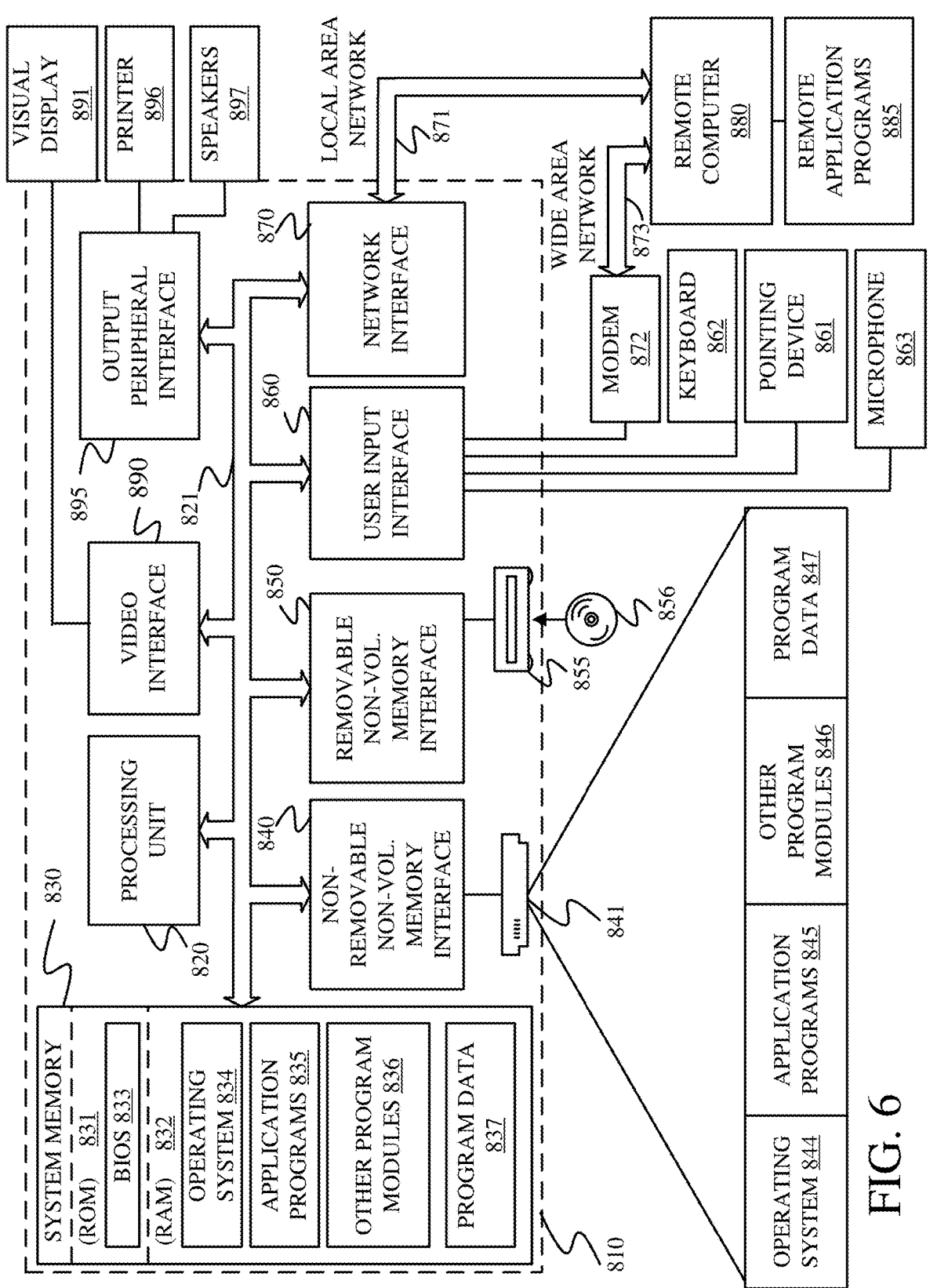
FIG. 6 is a block diagram showing one example of a computing environment.

FIG. 6 is one example of a computing environment in which elements of previous FIGS., or parts of it, (for example) can be deployed. With reference to FIG. 6, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
at least one processor; and
memory storing computer executable instructions which, when executed by the at least one processor, cause the agricultural system to:
  detect a decision point, indicative of a location in a travel path over a field, at which an agricultural machine can follow a possible path that includes unharvested crop;
  process one or more crop damage parameters to identify a crop damage result indicative of estimated crop damage the agricultural machine will inflict on crops in the field if the agricultural machine travels over the possible path;
  identify one or more maneuvers to perform along at least a portion of the possible path based on a determination that the estimated crop damage exceeds a crop damage threshold and a determination that the possible path has a path length less than a path length threshold; and
  control the agricultural machine to perform the one or more maneuvers.

2. The agricultural system of claim 1, wherein the path length threshold is defined based on one or more characteristics of the agricultural machine.

3. The agricultural system of claim 2, wherein the one or more characteristics comprise one or more physical properties of the agricultural machine.

4. The agricultural system of claim 1, wherein the one or more maneuvers comprises a reverse maneuver that reverses the agricultural machine from a point along the possible path toward the decision point.

5. The agricultural system of claim 4, wherein the instructions, when executed by the at least one processor, cause the agricultural system to:
  determine a likelihood that the agricultural machine can successfully execute the reverse maneuver based on one or more characteristics of the reverse maneuver and one or more characteristics of the agricultural machine; and
  control the agricultural machine based on the likelihood.

6. A computer implemented method of controlling an agricultural machine, the computer implemented method comprising:
  detecting a decision point, indicative of a location in a field over which the agricultural machine is traveling, at which the agricultural machine can follow one of a plurality of different pre-defined possible paths;
  identifying a particular path, of the plurality of different pre-defined possible paths, as based on a decision criterion;
  processing one or more crop damage parameters to identify a crop damage result indicative of estimated crop damage if the agricultural machine travels over the particular path;
  based on a determination that the estimated crop damage exceeds a crop damage threshold, determining that the particular path has a path length less than a path length threshold;
  based on the particular path having a path length less than the path length threshold, identifying one or more maneuvers that, after traversing at least a portion of the particular path, return the agricultural machine to the decision point and traverse at least one other path of the plurality of different pre-defined possible paths; and
  controlling the agricultural machine based on the one or more maneuvers.

7. The computer implemented method of claim 6, wherein the decision criterion comprises path length.

8. The computer implemented method of claim 6, wherein identifying the particular path comprises selecting a shortest path of the plurality of different pre-defined possible paths.

9. The computer implemented method of claim 6, wherein the one or more maneuvers comprise a reverse maneuver from a point along the particular path toward the decision point.

10. The computer implemented method of claim 6, wherein the path length threshold is defined based on one or more characteristics of the agricultural machine.

11. The computer implemented method of claim 10, wherein the one or more characteristics comprise one or more physical properties of the agricultural machine.

12. A computer implemented method of controlling an agricultural machine, the computer implemented method comprising:
  detecting a decision point, indicative of a location in a travel path over a field, at which the agricultural machine can follow a possible path that includes unharvested crop;
  processing one or more crop damage parameters to identify a crop damage result indicative of estimated crop damage the agricultural machine will inflict on crops in the field if the agricultural machine travels over the possible path;
  identifying one or more maneuvers to perform along at least a portion of the possible path based on a determination that the estimated crop damage exceeds a crop damage threshold and a determination that the possible path has a path length less than a path length threshold; and
  controlling the agricultural machine to perform the one or more maneuvers.

13. The computer implemented method of claim 12, wherein the path length threshold is defined based on one or more characteristics of the agricultural machine.

14. The computer implemented method of claim 13, wherein the one or more characteristics comprise one or more physical properties of the agricultural machine.

15. The computer implemented method of claim 12, wherein the one or more maneuvers comprises a reverse maneuver that reverses the agricultural machine from a point along the possible path toward the decision point.

16. The computer implemented method of claim 15, and further comprising:

determining a likelihood that the agricultural machine can successfully execute the reverse maneuver based on one or more characteristics of the reverse maneuver and one or more characteristics of the agricultural machine; and controlling the agricultural machine based on the likelihood.

* * * * *